(12) United States Patent
Liu et al.

(10) Patent No.: US 7,159,279 B2
(45) Date of Patent: Jan. 9, 2007

(54) PIVOTAL HINGE MECHANISM USED FOR PORTABLE COMPUTER

(75) Inventors: Jen-Hao Liu, Taipei (TW); Jung-Sheng Chiang, Taipei (TW); Yu-Yuan Lin, Taipei (TW); Ko-Chun Cheng, Taipei (TW)

(73) Assignee: Compal Electronic, Inc., Taipei (TW)

( * ) Notice: Subject to any disclaimer, the term of this patent is extended or adjusted under 35 U.S.C. 154(b) by 158 days.

(21) Appl. No.: 11/048,803

(22) Filed: Feb. 3, 2005

(65) Prior Publication Data

US 2005/0198780 A1    Sep. 15, 2005

(51) Int. Cl.
*E05D 3/10* (2006.01)

(52) U.S. Cl. .............................. 16/367; 16/366; 16/327; 16/374

(58) Field of Classification Search ................... 16/367, 16/366, 374, 327, 328, 331, 332; 361/680–683; 248/917, 919, 920–922, 125.1, 125.8, 278.1; 348/373, 333.06; 455/575.1, 575.4, 550.1, 455/575.8, 90.3
See application file for complete search history.

(56) References Cited

U.S. PATENT DOCUMENTS

| | | | |
|---|---|---|---|
| 5,168,423 A * | 12/1992 | Ohgami et al. ............. | 361/681 |
| 5,206,790 A * | 4/1993 | Thomas et al. ............. | 361/681 |
| 5,335,142 A * | 8/1994 | Anderson .................... | 361/681 |
| 5,374,055 A * | 12/1994 | Tung ........................... | 473/485 |
| 6,256,837 B1 * | 7/2001 | Lan et al. .................... | 16/334 |
| 6,546,595 B1 * | 4/2003 | Huse ............................ | 16/326 |
| 6,587,333 B1 * | 7/2003 | Tseng et al. ................. | 361/681 |
| 6,591,533 B1 * | 7/2003 | Wygant ........................ | 42/72 |
| 6,688,572 B1 * | 2/2004 | Huang et al. ............. | 248/291.1 |
| 6,711,780 B1 * | 3/2004 | Lee ............................... | 16/326 |
| 6,742,221 B1 * | 6/2004 | Lu et al. ....................... | 16/367 |
| 6,804,861 B1 * | 10/2004 | Hsu .............................. | 16/366 |
| 7,096,540 B1 * | 8/2006 | Watanabe et al. ............. | 16/367 |
| 2003/0052857 A1 * | 3/2003 | Pappas ....................... | 345/156 |
| 2005/0207104 A1 * | 9/2005 | Love .......................... | 361/683 |
| 2006/0168756 A1 * | 8/2006 | Sato et al. .................... | 16/22 |

FOREIGN PATENT DOCUMENTS

| | | | |
|---|---|---|---|
| DE | 29506037 U1 | * | 8/1996 |
| EP | 807878 A1 | * | 11/1997 |
| JP | 2004053927 A | * | 2/2004 |
| WO | WO 2004109131 A1 | * | 12/2004 |

* cited by examiner

*Primary Examiner*—Chuck Y. Mah
(74) *Attorney, Agent, or Firm*—Bacon & Thomas, PLLC

(57) ABSTRACT

An improved pivotal hinge mechanism used for portable computer equipped with a stopper device which when portable computer and a docking station are joined together shall be actuated by the docking station to prevent the LCD of the portable computer from rotating in left and right direction, so that the collision happened between the docking station and the LCD of the portable computer due to rotation of the LCD relative to the computer mainframe shall be avoided; when the portable computer is disconnected from the docking station said stopper device shall immediately return to the normal position so that the LCD of the portable computer can rotate again in an angle of 0–180 degrees in left and right direction with respect to the computer mainframe.

16 Claims, 5 Drawing Sheets

PIVOTAL HINGE MECHANISM USED FOR PORTABLE COMPUTER

BACKGROUND OF THE PRESENT INVENTION

1. Field of the Present Invention

The invention relates to an improved pivotal hinge mechanism used for portable computer, particularly to a pivotal hinge mechanism equipped with stopper device to prevent rotation of the LCD of portable compute when portable computer and a docking station are joined together and to prevent collision happened between the LCD and the docking station.

2. Description of Prior Act

Presently, the note book type computer popularly used by the public today has possessed the function of allowing the LCD to rotate an angle of 0~180 degrees and to be transferred from note book type computer to tablet type computer. The key technique which enables the note book PC to possess the above-mentioned function is the pivotal hinge mechanism employed for joining the LCD and the computer mainframe of the note book PC such as the technique disclosed by U.S. Pat. No. 6,587,333.

With this mechanism the LCD of note book PC can achieve the function of opening-up and closing-down, rotating an angle of 0~180 degrees relative to the mainframe as well as the function of transferring the mode of application from note book PC to tablet PC. Moreover, in order to extend the function of application of note book PC to enable an extension of USB connecting port, PS/2 connector, CD/DVD driver and network card to further improve the usability and mobility of this type of note book PC.

However, since the conventional pivotal hinge mechanism used for this type of note book PC does not equipped with any stopper device for preventing the rotation of LCD in left and right direction when the note book PC is joined to a docking station, therefore, when this type of note book PC is joined to docking station collision happened between LCD and docking station will be caused due to rotation of LCD in left and right direction that will cause damage of LCD and docking station.

SUMMARY OF THE PRESENT INVENTION

In consideration of the above-mentioned drawbacks the major purpose of the invention is to provide an improvement to the conventional pivotal hinge mechanism used for the portable computer to equip the conventional pivotal hinge mechanism with stopper device, so that when the portable computer is joined with a docking station, the stopper device shall prevent the rotation of the LCD of portable computer in left and right direction so that the collision happened between the LCD and the docking station due to the rotation of LCD shall be avoided.

Another purpose of the invention is to provide a pivotal hinge mechanism equipped with stopper device which comprises at least a swivel seat, a support seat and a stopper device wherein the swivel seat and the support seat are pivotally joined together. The swivel seat has a first stopper shoulder which has a sector angle of $\theta_1$, and the support seat relatively has a second stopper shoulder which has a sector angle of $\theta_2$, when the swivel seat rotates relative to the support seat, the two ends of the first stopper shoulder of the swivel seat will touch and stop the respective ends of the second stopper shoulder to enable an angular movement of the swivel seat within 0~180 degrees with respect to the support seat which is enabled by limiting the total angular movement within the range of $\theta_1+\theta_2=180$ degrees. The stopper device comprises at least a gripping piece and a driving piece. Since the stopper device is installed on the swivel seat in such a way that the gripping piece may freely move up and down with respect to the support seat so that when the portable computer is joined to a docking station, the driving piece of the stopper device is pushed up which in turn moves up the gripping piece of the stopper device to a position adjacent to the first stopper shoulder of the swivel seat, so that the two ends of the first stopper shoulder of the swivel seat are stopped by the second stopper shoulder of the support seat and the gripping piece of the stopper device respectively, and the swivel seat is therefore unable to move in left and right direction; whereas when the portable computer is disconnected from the docking station, the stopper device will immediately return to its normal position that enables the swivel seat able to rotate again through an angle of 0~180 degrees in left and right direction.

Further purpose of the invention is to provide a pivotal hinge mechanism with stopper device wherein the gripping piece of the stopper device has a curved guide surface which when the gripping piece moves up can guide the gripping piece to move smoothly so as to prevent the swivel seat of the pivotal hinge mechanism from rotating in left and right direction.

BRIEF DESCRIPTION OF THE DRAWING FIGURES

DETAILED DESCRIPTION OF THE PREFERRED EMBODIMENTS

Figure 1:
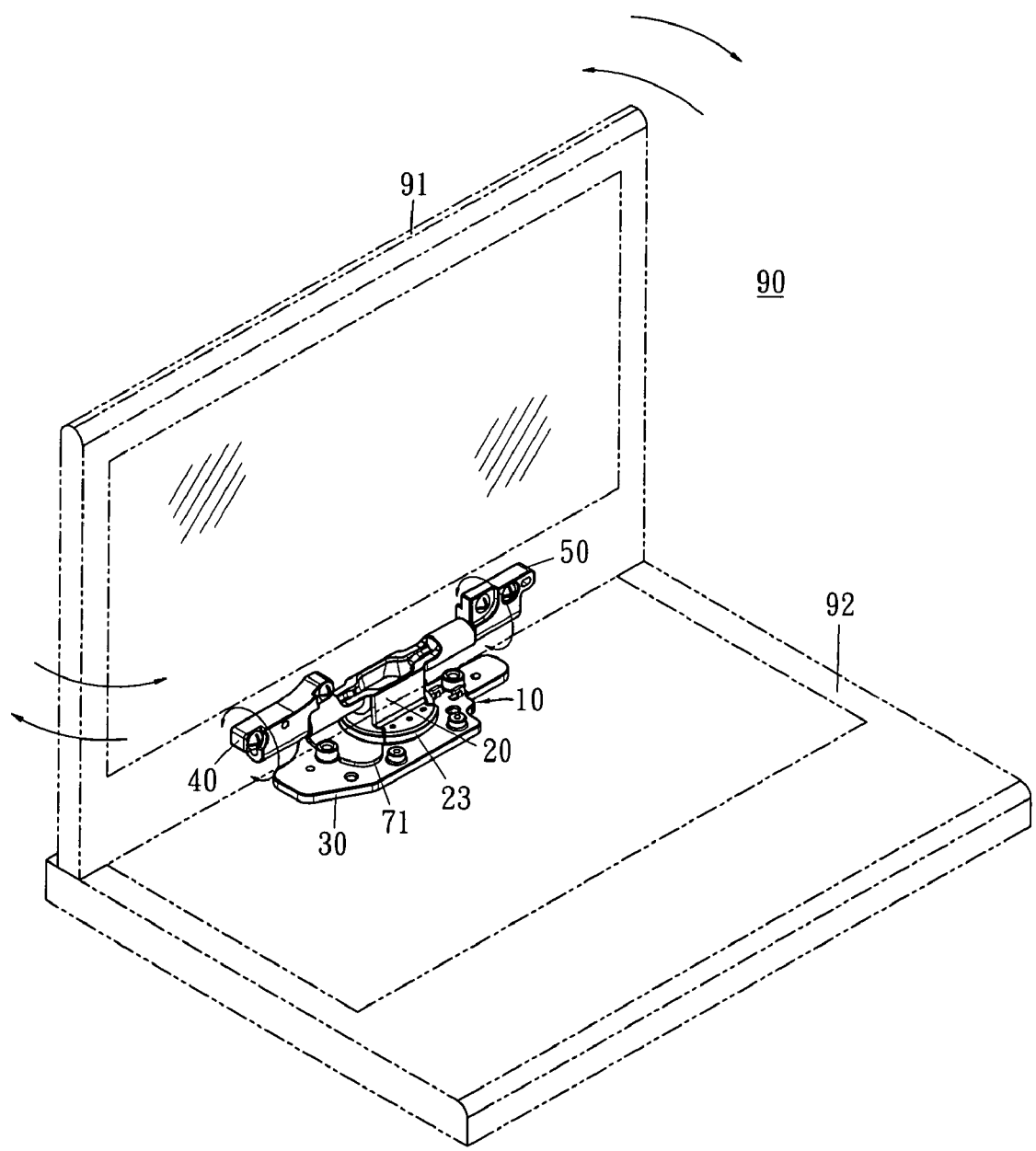
FIG. 1 is application drawing of the pivotal hinge mechanism of this present invention applied on the electronic equipment such as note book type computer.

As shown in FIGS. 1 to 4, the pivotal hinge mechanism (10) disclosed by the invention shall be used as the pivotal hinge mechanism of electronic equipment such as note book computer (90), and is equipped with stopper device (70) which enables the electronic equipment to possess the following two functions of application:

1. Enable the LCD (91) of the electronic equipment (90) to possess a swivel shaft, and enable the electronic equipment (90) to possess a swivel LCD (91) which may rotate an angle of 0~180 degrees in clockwise and counter clockwise direction. And, by employing this mechanism the electronic equipment (90) is able to be transferred from Note book PC mode to Tablet PC mode;
2. Enable the function of preventing collision between the LCD (91) of the electronic equipment (90) and a docking station (95) due to rotation of LCD (91) in left and right direction after the electronic equipment (90) and the docking station (95) are joined together.

Figure 3:
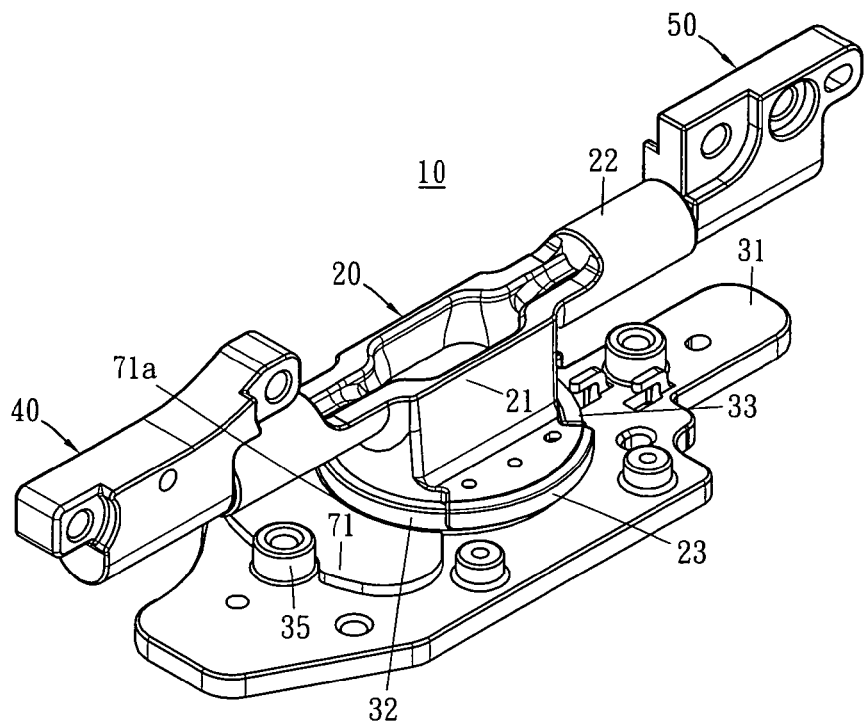
FIG. 3 is three dimensional schematic drawing of the pivotal hinge mechanism of this present invention.
Figure 4:
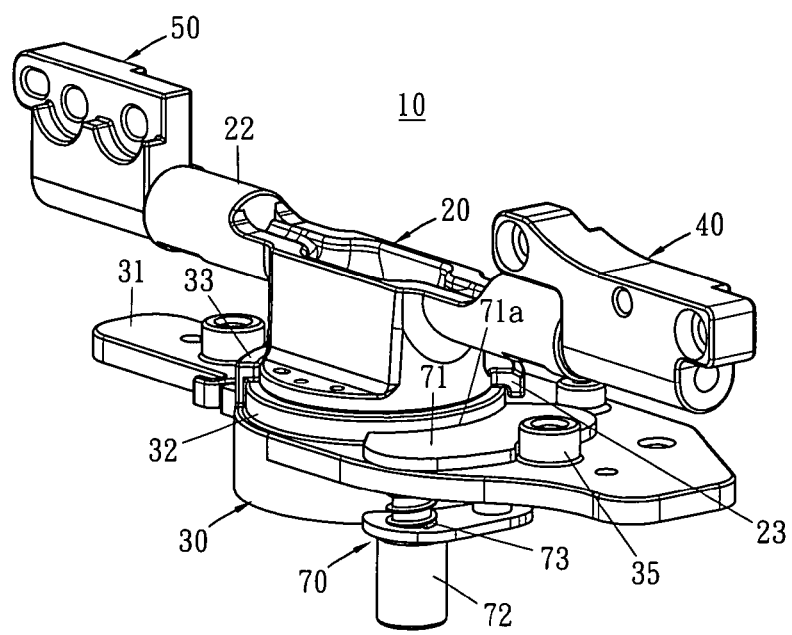
FIG. 4 is three dimensional schematic drawing of the pivotal hinge mechanism of this present invention viewed from different visual angle.
Figure 5:
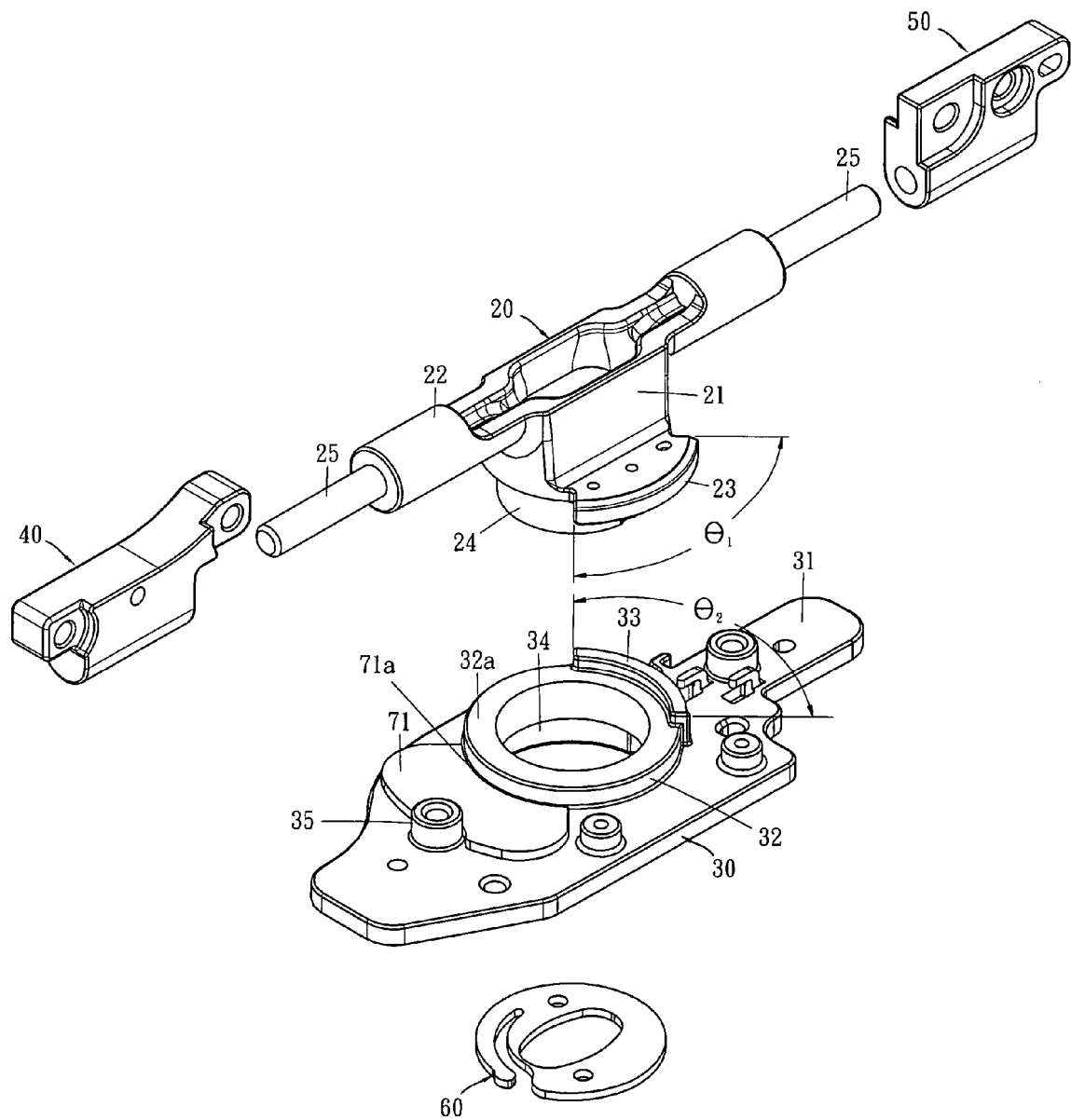
FIG. 5 is the parts disassembly drawing of the pivotal hinge mechanism of this present invention.

As shown in FIGS. 3 to 5, the pivotal hinge mechanism (10) as mentioned by the invention comprises a swivel seat (20), a support seat (30), a first pivot mounting part (40), a second pivot mounting part (50), a positioning plate (60) and a stopper device (70). Wherein the said swivel seat (20) and the support seat (30) are pivotally joined together, the swivel seat (20) can rotate relative to the support (30) within an angle of 0~180 degrees, and by the effect of the positioning plate the swivel seat (20) and the support seat (30) shall not be separated from each other.

Therefore, as shown in FIG. 1, after installing the support seat (30) on the computer mainframe (92) of the electronic equipment (90), and installing the swivel seat (20) as the swivel shaft of the LCD (91) of the electronic equipment (90), the LCD (91) shall possess the function of rotating an angle of 0~180 degrees relative to the computer mainframe.

Referring to FIG. 5, the main body of the swivel seat (20) is the base seat (21) which serves as the swivel shaft, and has a cylindrical neck shaft (24) having hollow center portion extended from the bottom side of the base seat (21). In addition, a sector shaped flange portion formed along part of the edge the lower end of the base seat having a sector angle of $\theta_1$; with center line of neck shaft as the center of the sector shaped flange to form the first stopper shoulder (23) of the swivel seat (20). When the swivel seat (20) and the support seat (30) are pivotally joined together, the said first stopper shoulder (23) of the swivel seat (20) has the effect of restricting the rotating movement of the swivel seat (20) relative to the support seat (30) within an angle of 0~180 degrees.

Besides, on the upper end of the base seat (21) of the swivel seat (20), two shaft shaped mounting rods are extended from left and right side form the connecting shaft (22) of the swivel seat (20). Further, two pivotal shafts (25) are extend separately from the end portion of the left and right connecting shaft (22) for mounting the first pivotal mounting part (40) and the second pivotal mounting part (50).

Therefore, the first pivotal mounting part (40) and the second pivotal mounting part (50), when pivotally joined to the swivel seat (20), can rotate about the pivotal shaft (25), and rotate relative to the swivel seat (20).

Thus, as shown in FIG. 1, when the first pivotal mounting part (40) and the second pivotal mounting part (50) are fastened to the LCD (91) of the electronic equipment, and form pivotal joint with the swivel seat (20), the pivotal shaft (25) of the swivel seat (20) shall become the rotating shaft of the LCD (91) of the electronic equipment (90) to enable the rotating movement of opening-up and closing-down of the LCD (91) of the electronic equipment (90).

Meanwhile, when the swivel seat (20) is pivotally joined with the support seat (30) which is fastened on the computer mainframe (92) of the electronic equipment (90), the LCD (91) of the electronic equipment (90) can achieve the function of opening-up, closing-down and rotating either in clockwise or in counter clockwise direction with an angle of 0~180 degrees by means of installing the pivotal hinge mechanism provided by the present invention as well as the function of transferring the electronic equipment from Note Book PC to Tablet PC.

The support seat (30) is structured by having the plate-shaped main body (31) fastened on the computer mainframe (92) of the electronic equipment (90) as the main body, and cylindrical hollow shaft (32) is formed on the upper surface of the plate-shaped main body (31) having a center hole (34) inside the cylindrical hollow shaft (32) which has two inner diameters arranged in stage-shape, i.e. the inner diameter of the upper part of the center hole (34) is smaller than the inner diameter of the lower part. However, the inner diameter of the upper part of the center hole (34) is little bit greater than the outer diameter of the neck shaft (24) of the aforesaid swivel seat (20), and the inner diameter of the lower part of the center hole (34) is little bit greater than the outside diameter of the positioning plate (60).

Besides, on the end surface (32a) of the upper part of the cylindrical hollow shaft (32) of the support seat (30) a sector shaped Flange having sector angle of $\theta_2$ is formed along the edge of the end surface with the center line of the center hole (34) as the center of the said sector shaped flange to form the second stopper shoulder (33).

After the neck shaft (24) on the swivel seat (20) is installed in the center hole (34) from the upper side of the support seat (30), the positioning plate (60) is installed in the center hole (34) from the bottom side of the support seat (30), then fasten the positioning plate to the neck shaft (24) of the swivel seat by screws to achieve the co-axial pivotal joint between the swivel seat (20) and the support seat (30). Now, the bottom surface of the lower end of the base seat (21) of swivel seat (20) touches, and is supported by the end surface (32a) of the upper part of cylindrical hollow shaft (32) of support seat (30). In addition, the first stopper shoulder (23) and the second stopper (33) of the support seat 30 are arranged to be adjacent to each other so that the range of movement of the first stopper shoulder (23) of the swivel seat (20) is limited by the second stopper shoulder (33) of the support seat (30).

As shown in FIG. 3 to 5 since the purpose of the pivotal hinge mechanism (10) of the invention is to set the condition that the sum of the sector angle $\theta_1$ of first stopper shoulder (23) of the swivel seat (20) and the sector angle $\theta_2$ of the second stopper shoulder (33) of the support seat (30) is $\theta_1+\theta_2=180$ degrees, when the swivel seat (20) rotates, the first stopper shoulder (23) of the swivel seat (20) will touches the respective end of the second stopper shoulder (33) of the support seat (30), and the angular movement of the swivel sent is therefore limited to 0~180 degrees.

Figure 6:
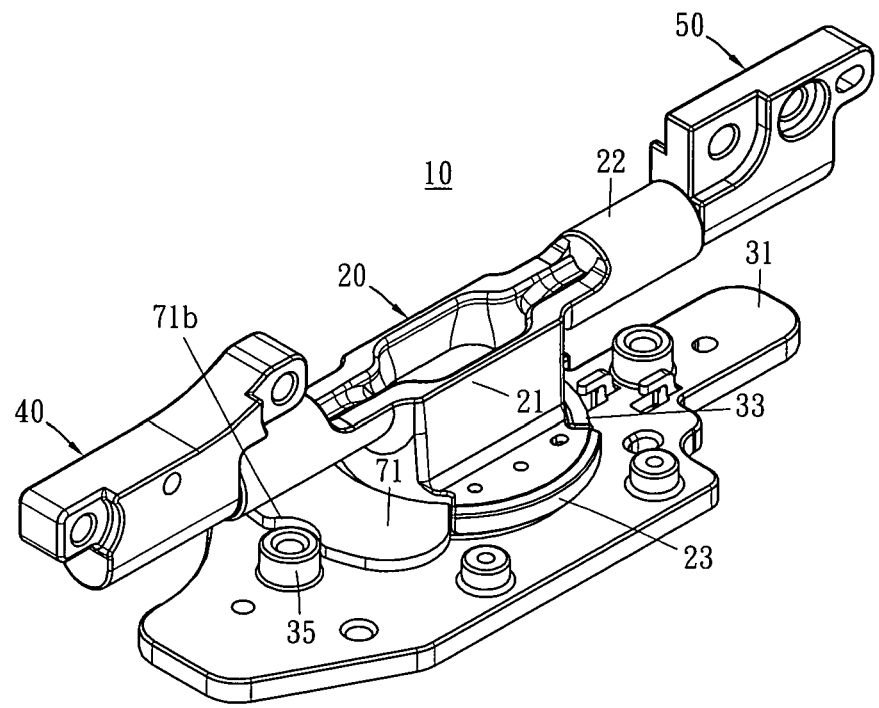
FIG. 6 is application drawing showing how the stopper device of the pivotal hinge mechanism of this present invention prevents the swivel seat from rotating in left and right direction.
Figure 7:
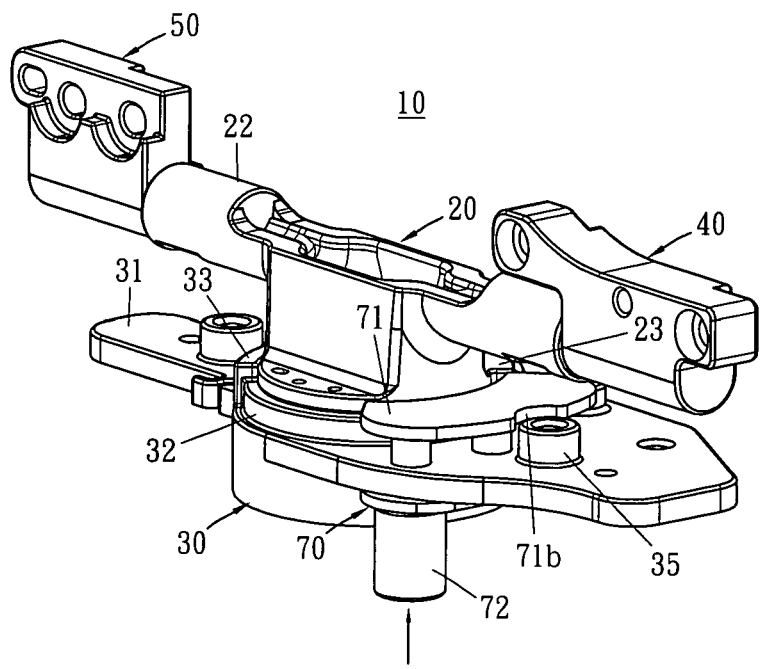
FIG. 7 is application drawing of the pivotal hinge mechanism shown in FIG. 6 viewed from different visual angle.

Referring to FIGS. 3 and 4, the stopper device (70) comprises at least a gripping piece (71) and a driving piece (72) which are assembled and installed on the plate-shaped main body (31) of the support seat (30) wherein the driving piece (72) is positioned on the bottom side of the plate-shaped main body (31) of the support seat (30), and is arranged in such a way that the assembly allows the driving piece (72) to move up and down freely on and relative to the plate-shaped main body (31) of the support seat (30). While the gripping piece (71) is positioned on the upper side of the plate-shaped main body (31), and is integrally formed with the driving piece (72) as a whole unit, therefore, as shown in FIGS. 6 and 7, when the driving piece (72) is acted by upward pushing force to move up, the gripping piece (71) will also move up, and when the upward pushing force acted on the driving piece (72) disappears, the driving piece (72) and the gripping piece (71) will simultaneously return to the original position.

Further as shown in FIGS. 3 and 4, under normal operation condition the driving piece (72) is not acted by any upward pushing force, the gripping piece (71) of the stopper device (70) is in a position which does not interfere with the rotation of the swivel seat (20) of the invention in left and right direction through an angle of 0~180 degrees. However, when the first stopper shoulder (23) of the swivel seat (20) is in a position adjacent to and toughing the second stopper shoulder (33) of the support seat (30), and the driving piece (72) is acted by upward pushing force to move up, then as illustrated in FIGS. 6 and 7, the gripping piece (71) will also move up to the position just adjacent to the first stopper shoulder (23) of the swivel seat (20), therefore, the two ends of the first stopper shoulder (23) of the swivel seat (20) are stopped by the second stopper shoulder (33) of the support seat, and the gripping piece (71) of the stopper device (70), and the swivel seat (20) shall no longer rotate in left and right direction.

Figure 2:
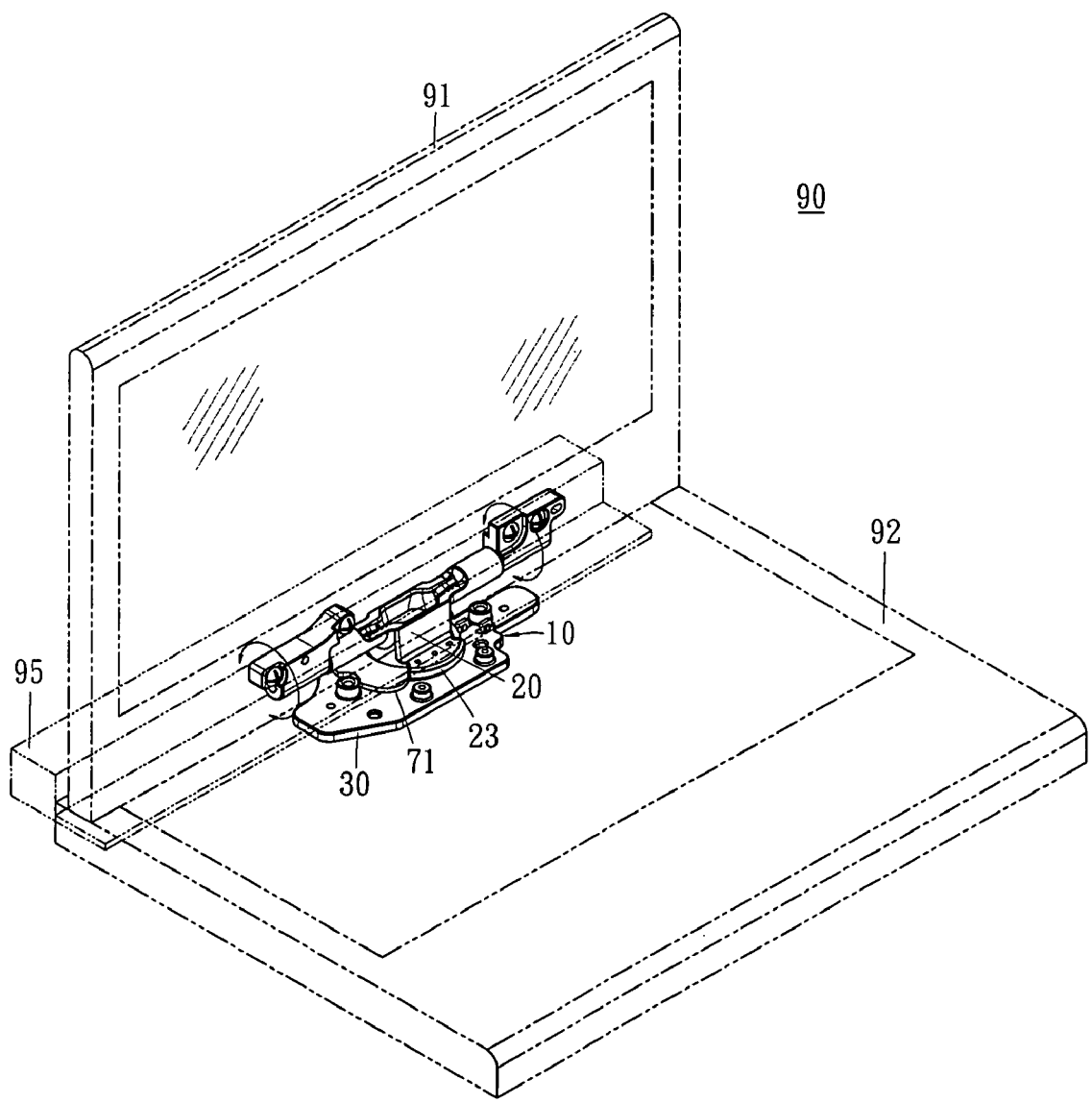
FIG. 2 is application drawing of the pivotal hinge mechanism of this present invention showing the function of preventing the LCD from rotating in left and right direction so as to prevent the LCD from colliding with a docking station due to rotating of LCD.

Moreover, as shown in FIG. 2, when the pivotal hinge mechanism (10) of the invention is installed on the electronic equipment (90), the position of the driving piece (72) of the stopper device (70) is arranged in such a way that when the electronic equipment (90) is joined with a docking station (95), the contact surface of the docking station (95) will touch the driving piece (72) and push it to move up which will simultaneously lift up the gripping piece (71) of the stopper device (70).

With this function mentioned above, once the electronic equipment (90) is joined with the docking station (95) the stopper device (70) of the pivotal hinge mechanism (10) of the invention shall prevent the LCD (91) of the electronic equipment (90) from rotating in left and right direction, so that to prevent the collision happened between the LCD (91) and the docking device (95) due to rotating of the LCD (91) in left and right direction. When the electronic equipment (90) is disconnected from the docking station (95), the stopper device (70) of the pivotal hinge mechanism (10) of the invention will return to the original position so that the LCD (91) of the electronic equipment (90) shall rotate again within an angle of 0~180 degrees.

As shown in FIG. 4, the stopper device (70) of the invention may be equipped with a spring piece (73) installed between the driving piece (72) of the stopper device (70) and the plate-shaped main body (31) of the support seat (30) that the stopper device (70) shall always be maintained in the desired operation condition, or when the upward pushing force acted on the driving piece (72) disappears, the spring piece (73) will immediately restore the stopper device (70) of the invention to the original position.

In addition, as shown in FIGS. 3 to 7, the gripping piece (71) has a curve-shaped first guide surface (71a) which has a radius of curvature approximately equal to the outer diameter of the cylindrical hollow shaft (30) of the support seat (30). When the gripping piece (71) moves up, the outer surface of the cylindrical hollow shaft (30) of the support seat (30) serves as a guide rail to enable a smooth movement of the gripping piece (71).

Similarly, the plate-shaped main body (31) of the support seat (30) of the pivotal hinge mechanism (10) may be equipped a guide stud (35), and correspond to the guide stud (35) the gripping device (71) of the stopper device (70) of the invention shall have the second guide surface (71b). When the gripping piece (71) of the stopper device (70) moves up the gripping piece (71) shall move smoothly under the guide of the guide stud (35).

What is claimed is:

1. An improved pivotal hinge mechanism used for portable computer, comprising a swivel seat, a support seat, and a stopper device; wherein said swivel seat has a neck shaft, said support seat has a cylindrical hollow shaft, and the neck shaft of said swivel seat is pivotally joined with the cylindrical hollow shaft of said support seat; said swivel seat has a first stopper shoulder which corresponds to a sector angle of θ1;

said support seat has a second stopper shoulder which corresponds to a sector angle of θ2, and the sum of θ1+θ2 is 180 degrees with which said swivel seat is rotatable in left and right direction for an angle of 0 ~180 degrees; and said stopper device comprises a gripping piece and a driving piece, wherein the gripping piece and the driving piece are formed into a whole piece, and the driving piece is installed on said support seat in such a way that it is movable freely up and down relative to said support seat, wherein at an upper position, the gripping piece is adjacent to the first stopper shoulder of said swivel seat so that the two ends of the first stopper shoulder of said swivel seat are respectively positioned and clamped by between the second stopper shoulder of said support seat and the gripping piece of said stopper device.

2. The improved pivotal hinge mechanism as defined in claim 1, wherein said swivel seat has a connecting shaft on which a first pivotal mounting part and a second pivotal mounting part are pivotally installed.

3. The improved pivotal hinge mechanism as defined in claim 2, wherein said stopper device comprises a spring piece which is installed between the driving piece of the stopper device and the support seat.

4. The improved pivotal hinge mechanism as defined in claim 3, wherein the driving piece of said stopper device has a curve-shaped first guide surface which is in a radius of curvature same as the radius of curvature of the outside diameter of the cylindrical hollow shaft of said support seat.

5. The improved pivotal hinge mechanism as defined in claim 4, wherein said support seat has a guide stud, and the gripping piece of said stopper device has a second guide surface which is shaped corresponding to the shape of the guide stud.

6. The improved pivotal hinge mechanism as defined in claim 3, wherein said support seat has a guide stud, and the gripping piece of said stopper device has a second guide surface which is shaped corresponding to the shape of the guide stud.

7. The improved pivotal hinge mechanism as defined in claim 2, wherein the driving piece of said stopper device has a curve-shaped first guide surface which is in a radius of curvature same as the radius of curvature of the outside diameter of the cylindrical hollow shaft of said support seat.

8. The improved pivotal hinge mechanism as defined in claim 7, wherein said support seat has a guide stud, and the gripping piece of said stopper device has a second guide surface which is shaped corresponding to the shape of the guide stud.

9. The improved pivotal hinge mechanism as defined in claim 2, wherein said support seat has a guide stud, and the gripping piece of said stopper device has a second guide surface which is shaped corresponding to the shape of the guide stud.

10. The improved pivotal hinge mechanism as defined in claim 1, wherein said stopper device comprises a spring piece which is installed between the driving piece of the stopper device and the support seat.

11. The improved pivotal hinge mechanism as defined in claim 10, wherein the driving piece of said stopper device has a curve-shaped first guide surface which is in a radius of curvature same as the radius of curvature of the outside diameter of the cylindrical hollow shaft of said support seat.

12. The improved pivotal hinge mechanism as defined in claim 11, wherein said support seat has a guide stud, and the gripping piece of said stopper device has a second guide surface which is shaped corresponding to the shape of the guide stud.

13. The improved pivotal hinge mechanism as defined in claim 10, wherein said support seat has a guide stud, and the gripping piece of said stopper device has a second guide surface which is shaped corresponding to the shape of the guide stud.

14. The improved pivotal hinge mechanism as defined in claim 1, wherein the driving piece of said stopper device has a curve-shaped first guide surface which is in a radius of curvature same as the radius of curvature of the outside diameter of the cylindrical hollow shaft of said support seat.

15. The improved pivotal hinge mechanism as defined in claim 14, wherein said support seat has a guide stud, and the gripping piece of said stopper device has a second guide surface which is shaped corresponding to the shape of the guide stud.

16. The improved pivotal hinge mechanism as defined in claim 1, wherein said support seat has a guide stud, and the gripping piece of said stopper device has a second guide surface which is shaped corresponding to the shape of the guide stud.

* * * * *